Sept. 15, 1964 R. McFARLAND, JR 3,148,861
WEIR VALVE
Filed June 27, 1962

INVENTOR.
Rolland McFarland, Jr.
BY
Olson & Trexler attys

United States Patent Office 3,148,861
Patented Sept. 15, 1964

3,148,861
WEIR VALVE
Rolland McFarland, Jr., Crystal Lake, Ill., assignor to Hills-McCanna Company, Carpentersville, Ill., a corporation of Illinois
Filed June 27, 1962, Ser. No. 205,795
12 Claims. (Cl. 251—331)

The present invention relates to weir valves through which the flow of fluid is controlled by the position of a flexible diaphragm relative to a transverse weir. This application is a continuation-in-part of copending application Serial No. 835,511, filed August 24, 1959, now abandoned.

Weir valves are particularly well suited for use in many environments, such, for example, as in the chemical processing field, for controlling the flow of caustic and corrosive liquids which can cause failures of other types of valves. The exceptional ability of weir type valves to resist damage from the action of the fluid being controlled stems from the fact that except for the single flexible diaphragm used in a weir valve all the moving parts of the valve are isolated from the fluid controlled by the valve in a manner which positively precludes contact of the working valve parts with the fluid so long as the diaphragm is not ruptured.

However, weir valves having practical commercial constructions have been subject to persistent weaknesses in that the valves and the environments in which they are used have subjected the valve diaphragms to treatment that has severely limited the service life of the diaphragms. These weaknesses, characteristic of weir valves, have added to the cost and effort involved in maintaining the valves in service.

One object of the invention is to provide a weir valve having a new and improved construction which greatly extends the effective service life of the complete valve, including the valve diaphragm.

Another object is to provide a weir valve having an improved construction which avoids accelerated destruction in the valve of essential diaphragm structure by destructive stresses which have shortened the service life of diaphragms in conventional weir valves.

Another object is to provide an improved weir valve well adapted for economical manufacture on a commercial basis and providing in use a greatly extended service life free of diaphragm failure.

Another object is to provide for incorporation into a weir valve, an improved weir valve diaphragm having a unique construction which will withstand without damage the severe treatment to which such diaphragms are characteristically subjected in weir valves, the improved weir valve diaphragm having by virtue of its unique construction the ability to maintain its strength and structural integrity in a weir valve over a long service life of hard usage.

Other objects and advantages will appear from the following description of the exemplary embodiment of the invention illustrated in the drawings, in which.

Figures 1, 2, 3, 4:
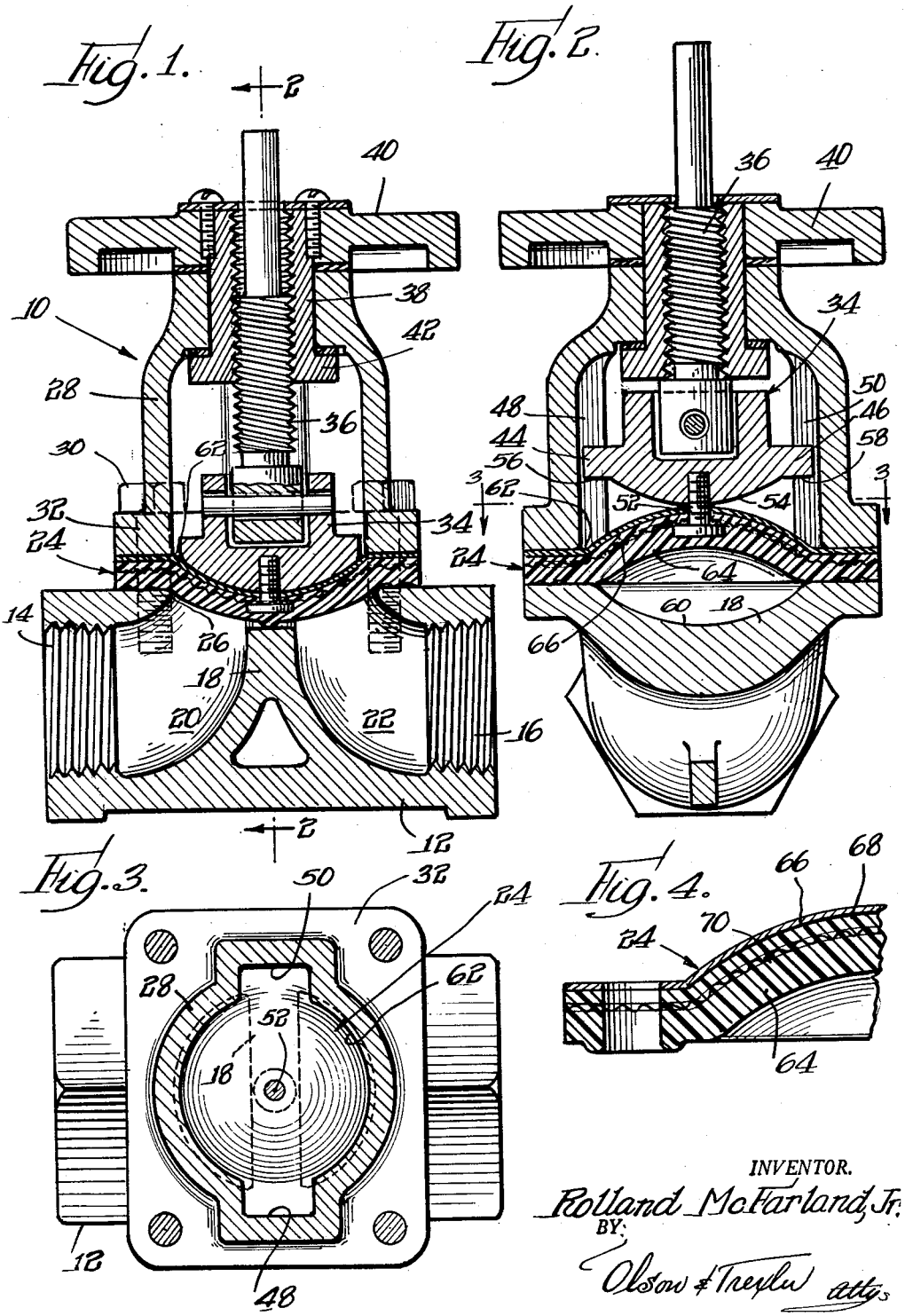
FIGURE 1 is a vertical longitudinal sectional view of a weir valve embodying the invention.
FIG. 2 is a vertical sectional view of the valve taken along the line 2—2 of FIG. 1.
FIG. 3 is a horizontal sectional view taken generally along the line 3—3 of FIG. 2 and showing in broken lines the downwardly projected outline of the diaphragm compressor head.
FIG. 4 is an enlarged fragmentary sectional view of the valve diaphragm.

Referring to the drawings in greater detail, the weir valve 10 forming the illustrated embodiment of the invention comprises a valve body or housing 12 defining two opposed passages 14, 16 opening into the valve body as shown in FIG. 1. Upon installation of the valve the passages 14, 16 are suitably connected to coacting conduits or the like (not shown) which carry fluid into and out of the valve.

Fluid flowing through the valve between the passages 14, 16 must pass over a transverse weir 18 formed in this instance as an integral part of the valve body 12 to extend transversely across the inner ends of the passages 14, 16 in spaced relation to the adjacent ends of the passages, as shown. Thus, the valve body defines internal fluid flow spaces or channels 20, 22 extending from the respective passages 14, 16 up around opposite sides of the laterally extending transverse weir 18 to converge along the extreme edge of the weir, as shown.

Communication of the internal flow channels 20, 22 with each other is controlled by the positional relationship to the weir 18 of a flexible flow control diaphragm 24. This diaphragm is supported and positioned in relation to the weir 18 by control structure which, of itself, has a conventional design or construction.

The diaphragm 24 in its relaxed condition has a centrally dished form and a generally rectangular shape as viewed from one side. It is held against the valve body 12 in overlying covering relation to a generally circular opening 26 formed in the upper side of the valve body in encircling spaced relation to the extreme edge of the weir 18 and the adjacent ends of the flow channels 20, 22, as shown in FIGS. 1 to 3.

The rectangular marginal edge of the diaphragm 24 is firmly clamped to the peripheral edge of the valve housing 12 defining the opening 26 by the inner flange 32 of an overlying valve bonnet 28 detachably secured to the valve body 12 by bolts 30 anchored to the valve body and extending through the diaphragm and through the bonnet flange.

The diaphragm 24 is positioned in relation to the weir 18 to control the flow of fluid through the valve by means of a compressor head 34 supported in the bonnet 28 for translation toward and away from the weir 18. As shown, the compressor head 34 is mounted on the inner end of a threaded control stem 36 which extends outwardly through an internally threaded control nut 38 rotatably supported in the outer end of the bonnet 28. The nut 38 is rotated to displace the control stem 36 axially by means of a manual control knob 40 fixed to the outer end of the nut 38, the nut being held against axial displacement by engagement with the bonnet of the knob 40 on the outer end of the nut and an annular shoulder 42 on the inner end of the nut.

Rotation of the compressor head 34 is precluded by a pair of lugs 44, 46, FIG. 3, projecting radially in opposite directions from the periphery of the inner end of the compressor head into a pair of longitudinal grooves or guides 48, 50 formed in the bonnet 28 in alinement with opposite ends of the weir 18. In addition to guiding translation of the compressor head 34, the lugs 44, 46 serve an additional function, upon closing of the valve, of effecting a tight seal between the diaphragm 24 and opposite ends of the weir 18 which underlie the respective lugs. As shown in FIGS. 1 and 2, and as indicated in FIG. 3 (which illustrates in broken lines a downward projection of the outline of the lower end of the compressor head 34), the compressor head 34 has a loose fit within the bonnet 28 which leaves substantial clearance between the periphery of the compressor head and the encompassing portion of the bonnet.

The center of the diaphragm 24 is secured to the center of the opposing compressor head 34 by a threaded stud 52 embedded in the diaphragm and extending into the head as shown in FIGS. 1 and 2.

As described thus far, the valve 10 is formed of a conventional construction. In this connection, it may be noted that the inner face of the compressor head 34 defines a convex diaphragm opposing surface 54 which has a shape conforming to that of a segment of a spherical surface, the spherical curvature of the surface 54 merging as shown in FIG. 2 with generally straight radial surfaces 56, 58 on the inner faces of the radial lugs 44, 46. The weir 18 has a concave shape, as viewed from one side, FIG. 2, which conforms to the surface 54.

As previously intimated, weir valves as typified by the valve 10 described, are particularly well suited for controlling the flow of fluid which may cause fouling or damage to other types of valves. Thus, all moving parts of the valve 10, except for the diaphragm 24, are absolutely isolated from contact with the fluid by the intervening presence of the diaphragm 24.

However, conventional weir valves and the environments in which weir valves are used have subjected the diaphragms of weir valves to treatment which has been so destructive to essential structure of the diaphragms that the diaphragms have had a severely limited service life. The destructive action of weir valves on the diaphragms used in the valves, and the attendant necessity for replacing the diaphragms have contributed much to the characteristically high maintenance costs of weir valves. Moreover, rupturing of diaphragms in conventional weir valves has been a source of costly inconvenience to the users.

In order to shut off communication between the valve passages or flow channels 20, 22, the central portion of the diaphragm 24 must engage and seal against an opposed portion of the valve body, specifically the weir 18 in the construction illustrated. In order to form an effective seal with the weir 18, the diaphragm 24 must compensate for irregularities in the shape of the weir and for differences between the shape of the weir and the opposing portion of the compressor surface 54 which urges the diaphragm against the weir.

In this connection it should be understood that both the compressor head 34 and the valve body 12 including the weir 18 are formed as castings. It is impractical to machine the compressor head and the weir so that the two are free of dimensional irregularities and conform precisely in shape to each other.

Hence, the diaphragm 24 must have the capability of yielding under a compressive load, and must have the ability to perform a cushioning action so as to compensate for irregularities in the shaping of the compressor head and the weir to form the necessary continuous seal along the weir.

The structure of the diaphragm 24 which provides the essential cushioning action or yieldability of the diaphragm under compressive load must have a very substantial thickness. Yet, this same diaphragm structure, which must have sufficient thickness to provide the necessary yieldability under compressive load, must be flexible so that the diaphragm is not too stiff and is not unduly resistant to flexing between the inwardly convex shape of the diaphragm when the valve is closed and the inwardly concave shape of the diaphragm when the valve is open. These functional requirements of the diaphragm, i.e., the limited resistance to flexing desired in a diaphragm having sufficient thickness to provide the desired cushioning action under compressive load, imposes certain limitations on the physical characteristics of materials which can be used in the construction of such diaphragms.

Also, the material used to form a diaphragm in a weir valve must be resistant to chemical attack and damage by the fluid to which the diaphragm is exposed in a valve.

It has been learned through extensive experience with weir valves that the structure of weir valve diaphragms which performs the essential function of cushioning the compressive action of the compressor head and forming a fluid-tight seal against the opposing portion of the valve body can be formed to best advantage from yieldable polymeric materials having a rather limited modulus of elasticity. A yieldable polymeric material having a limited or restricted modulus of elasticity, when used in the construction of a weir valve, is well suited to provide the desired yieldability of the diaphragm under compressive load, while at the same time providing the desired flexibility needed in working the diaphragm between its open valve and closed valve shape.

Having reference to the drawings, the diaphragm 24 has a cushioning or body layer 64 confronting the weir 18 and having a construction which in and of itself is generally similar to that of diaphragms in use in conventional weir valves. The body layer 64 performs the essential function of yielding under compressive load and sealing against the weir 18.

The body layer 64 is formed of a yieldable polymeric material having a limited modulus of elasticity. It may be, for example, an elastomeric material having physical capabilities proven in conventional weir valves. Such elastomeric materials include neoprene, Hycar, rubber, chlorobutyl, urethane, and silicone elastomers. The choice of the yieldable polymeric material having a limited modulus of elasticity which is used in forming the body layer 64 may be determined in large measure by the capability of the material of resisting attack by the fluid being valved. In some instances, it may be desirable to form the body layer 64 from polytetrafluoroethylene, sold commercially under the name "Teflon."

The diaphragm body layer 64 which performs the essential function of sealing against the weir 18 is of itself vulnerable to destruction by the treatment which the diaphragm receives in the valve. The yieldable polymeric material used in the construction of the layer 64 to provide the desired yielding under compressive load and the desired limited resistance to bending has a characteristic limited strength which is not sufficient to bear the abusive stresses to which the diaphragm is subjected by the valve and the environment in which the valve is used.

It will be observed, with reference to FIG. 2, that when the valve is open, the diaphragm 24 is generally unsupported between the marginal edge of the diaphragm which is clamped by the bonnet 28 and the center of the diaphragm which is engaged by the compressor head 34. The unsupported areas of the diaphragm may be subjected to the loads of severe internal valve pressures stemming from a number of causes which may include "water hammer" and an attempt to close the valve under "locked line" conditions. This places a lot of strain on the diaphragm, particularly along a circumferential hinge line, denoted in FIGS. 1 to 3 by the number 62, located at the circumferential juncture of the clamped marginal edge of the diaphragm with the internal portion of the diaphragm which is flexed as an incident to opening and closing of the valve.

Moreover, the stress concentrations at the circumferential hinge line 62 are intensified by the irregular shape of the circumferential hinge line at the diametrically opposed locations on the diaphragm where the recesses 48, 50, providing clearance for the lugs 44, 46, intersect the inner face of the bonnet 28 which is clamped against the diaphragm. The sharp turns in the circumferential hinge line 62 at the inner ends of the recesses 48, 50 are best illustrated in FIG. 3.

Because of the limited strength of the yieldable polymeric material of which it is made, the diaphragm body layer 64 itself is vulnerable to damage by the forces and strains to which the diaphragm is subjected in the valve.

The stresses to which unsupported portions of the diaphragm are subjected when the valve is open have been exceeded in prior valves by the stresses which have been applied to unsupported portions of diaphragms in weir valves when the valves were closed. As previously stated, there is a clearance between the periphery of the compressor head 34 and the bonnet 28. This clearance is identified in FIGS. 1 to 3 by the number 65. Since both the bonnet 28 and the compressor head 34 are formed as castings, it is economically impractical to manufacture these parts with sufficient dimensional precision to eliminate the clearance 65 around the compressor head.

As a consequence, there is, upon closure of the valve, a small space between the end of each of the compressor lugs 44, 46 and the bonnet 28, which space is identified in FIG. 2 by the number 65. In order to seal off communication between the two passages 20, 22, that portion of the diaphragm which extends between the end of each lug 44, 46 and the bonnet 28 must be pressed against the underlying portion of the body even though it is not backed up by either the bonnet or the compressor head.

The expedient of increasing the compressive force of the head 34 on the diaphragm to seal against the underlying body structure portions of the diaphragm extending between the lugs 44, 46 and the bonnet 28 can be effective for fully closing the valve. Compressive loads applied to the diaphragm by the bonnet and by the compressor head 34 create within clamped portions of the diaphragm a compressive loading of the diaphragm structure which spreads laterally within the diaphragm sufficiently to sealably clamp against the underlying body structure portions of the diaphragm extending between the two compressor lugs 44, 46 and the bonnet 28. Yet, this expedient of tightening the compressor head 34 against the diaphragm sufficiently to seal against the body structure portions of the diaphragm extending beyond the compressor head tends to subject portions of the diaphragm underlying the compressor head to excessive loads in compression which damage the diaphragm. Moreover, there is a tendency of a circumferential portion of the outer face of the diaphragm extending along the circumferential hinge line 62 to swell or protrude outwardly within the clearance 65 between the compressor head and bonnet. The diaphragm body layer 64 itself is incapable of withstanding such treatment in a weir valve without being subjected to damage which will severely limit the service life of the diaphragm.

In the valve 10 provided by the invention, the diaphragm body layer 64 is effectively protected from damage by structure which provides to the body layer protective support where it is most needed and when it is most needed. As illustrated in the drawings, the outer or "dry" side of the diaphragm body layer 64 is covered by a backing sheet 66 having a peripheral edge which is substantially conterminous with that of the layer 64. The flat marginal edge of the backing sheet 66 is engaged and clamped by the bonnet 28, and the medial portion of the backing sheet is confronted by the compressor head.

Inwardly of its clamped marginal edge, the backing sheet 66 has a disc shape which changes from an outwardly convex curvature to an outwardly concave curvature as the valve is closed from its open position. It will be noted that the backing sheet 66 fits against the outer surface of the diaphragm body layer 64 both when the valve is open, FIG. 2, and when the valve is closed, FIG. 1. Since the diaphragm body layer 64 is formed of a yieldable polymeric material, the outer surface of the body layer 64, which is outwardly convex when the valve is open, shrinks in area as it becomes outwardly concave upon closure of the valve. Since the area of the backing sheet 66 inwardly of the clamped marginal edge of the backing sheet must be sufficient to cover the outer surface of the diaphragm body layer 64 when the valve is open, this same area of the backing sheet tends to exceed the area of the outer surface of the diaphragm body layer 64 when the valve is closed, the closing of the valve being accompanied by a shrinkage in the area of the outer surface of the diaphragm layer 64, as explained.

Since the backing sheet 66 is on the side of the body layer 64 which contracts upon closure of the valve, there is a tendency for the backing sheet 66 to become slack as the valve is closed. Moreover, there is a tendency for the excess area of the backing sheet to progress toward the periphery of the compressor head 34 where it would produce slackness in that portion of the backing sheet 66 extending between the periphery of the compressor head 34 and the bonnet 28.

In the valve 10 provided by the invention, the diaphragm backing sheet 66 has a construction which assures that the portion of the backing sheet extending between the compressor head and the bonnet when the valve is closed is not slack and serves in tension to provide a strong bridge extending between the compressor head and the bonnet to transmit compressive loads from the bonnet and compressor head to portions of the body layer 64 overlying opposite ends of the weir 18 and underlying the clearance 65 between the compressor head and bonnet.

For this purpose, the backing sheet 66 is formed as an integral film of a yieldable polymeric material having a high tensile strength and a high modulus of elasticity. The film 66 should be at least ten thousandths of an inch thick, so that the film not only is strong in tension but has material resistance to bending, and also an ability to sustain substantial loads in compression in directions parallel to the film itself. Put another way, the film has sufficient strength and thickness to have a very substantial resistance to compressive loads tending to contract the area of the film.

It will be appreciated that the backing film 66 must flex along the hinge line 62 and must change its curvature between concave and convex forms as the valve is opened and closed. Also, the portion of the film 66 inwardly of the flat marginal edge of the film to be clamped must be susceptible of being formed so that it has a dish shape conforming to that of the corresponding portion of the body layer 64.

In addition, the film 66 should have sufficient strength to sustain the major portion of the outward load of the forces of fluid pressure and the reaction of the weir 18 on the body layer 64 to protect the body layer 64 from damaging stresses and tensions. To provide the desired high tensile strength in the film 66, while at the same time limiting the thickness of the film to avoid undue thickness, the film is formed of a yieldable polymeric material having a modulus of elasticity which is relatively high in relation to the modulus of elasticity of the yieldable polymeric material from which the body layer 64 is formed.

As a practical matter, the backing film 66 should be formed of a yieldable polymeric material having a minimum strength in tension which is of the order of eight thousand pounds per square inch, and the capability of remaining substantially immune from damage by the repeated flexing and localized stresses to which the backing film is subjected in the valve. Hence, in addition to having a minimum strength in tension of the order of eight thousand pounds per square inch, the polymeric material from which the film 66 is formed should have a minimum elongation of the order of three hundred percent and a capability to withstand flexing without damage indefinitely.

Two yieldable polymeric materials having physical properties making the materials suitable for forming the film 66 are nylon and terephthalate resin, sold commercially under the name "Mylar." Nylon and terephthalate resin typically have ultimate tensile strengths of approximately eight thousand and twenty one thousand pounds per square inch respectively. Neoprene and natural rubber, typical elastomeric materials used in the construction of the body layer 64, typically have ultimate tensile strengths of approximately seventeen hundred and thirty four hundred pounds per square inch respectively. Nylon and terephthalate resin have moduli of elasticity in a low elongation range (ten percent or less) which typically are approximately thirty three thousand and eight hundred thousand pounds per square inch for these two materials respectively. Corresponding moduli of elasticity in low ranges of elongation for neoprene and natural rubber, typically are approximately fifteen hundred and seventy five hundred pounds per square inch for these two materials respectively.

Because of the substantial resistance of the backing film 66 to compressive loads tending to contract the area of the film, and because of the material resistance of the film to bending loads (even though the film 66 is not stiff) the portion of the film 66 which extends between the bonnet 28 and the adjacent ends of the compressor head lugs 44, 46 when the valve is closed is not slack. The excess area of the film 66 in relation to the contracting area of the outer face of the body layer 64 of the diaphragm is distributed over the body layer 64 as the valve is closed so that it does not make for slackness in portions of the film extending between the compressor head and the bonnet. Consequently, the portions of the high strength film 66 overlying portions of the body layer 64 extending between the lugs 44, 46 and the bonnet serve in tension to preclude outward protrusion of underlying portions of the body layer and thereby aid in transmitting compressive loads to portions of the diaphragm body layer 64 which overlie opposite ends of the weir 18 but are not backed directly by either the bonnet or the compressor head.

In the preferred construction illustrated, the backing film 66 is secured to the outer surface of the diaphragm body layer 64 by a flexible cement 68.

The diaphragm body layer 64 which is relatively thick in relation to the film 66 is internally reinforced by a fabric reinforcing material 70 embedded in the layer 64 medially between the inner and outer surfaces of the layer 64.

It will be understood that the invention is not necessarily limited to the exact construction of the exemplary embodiment illustrated, but includes variants falling within the spirit and scope of the claims.

The invention is claimed as follows:

1. A weir valve comprising, in combination, a valve body defining passages therein, said body defining a raised weir disposed between said passages in transverse relation thereto and defining a concave and relatively narrow weir edge, a valve bonnet secured to said valve body in opposed covering relation to said weir and the adjacent portions of said passages, a flexible flow control diaphragm extending across said weir and the inner ends of said passages in opposing relation to said weir, the peripheral edge of said diaphragm being clamped between said bonnet and said body, said diaphragm having when unstressed a dished shape inwardly of the clamped peripheral edge thereof, a convex compressor head mounted in said bonnet in facing relation to the side of said diaphragm opposite from said weir for translation toward and away from said weir, said bonnet defining a pair of substantially straight internal guide slots extending toward said weir and having inner ends terminating in opposed alinement with opposite ends of the weir, said compressor head including radially projecting compressor lugs formed on diametrically opposite sides of the head and projecting into said respective guide slots to guide translation of the head toward and away from the weir and to apply compressive pressure to the portions of said diaphragm overlying opposite ends of said weir upon movement of the compressor head toward said weir to effect engagement of said diaphragm with the weir to close the valve, said compressor head having a loose fit within said bonnet whereby substantial clearance is provided between the periphery of the compressor head and the portion of the bonnet encompassing the weir side of the compressor head, said diaphragm including a body layer of elastomeric material which confronts said passages and directly opposes said weir, said elastomeric material forming said diaphragm body layer having sufficient resiliency to conform to said weir upon engagement of said diaphragm body layer with the weir to close the valve, said diaphragm including a backing film covering the side of said elastomeric body layer opposite from said weir and being formed of a thermoplastic flexible polymeric material having a tensile strength of at least eight thousand pounds per square inch and being for practical purposes unstretchable in relation to said elastomeric material of said body layer, said backing film being relatively thin in relation to said body layer and at the same time having a thickness which provides in the film strength that is sufficient to effectively resist stretching of the film by predetermined forces applied thereto through said body layer; said film having an integral, non-cloth structural form which is flexible to flex with said body layer toward and away from said weir while at the same time providing in the film a material resistance to bending and substantial resistance to compressive forces tending to contract the area of the film; said backing film having a peripheral edge which is substantially conterminous with the periphery of said diaphragm body layer and which is tightly anchored by a clamping action thereon by said bonnet to sustain the reaction on the backing film of outward forces transmitted thereto by said diaphragm body layer from fluid pressure within the valve and from said weir when the valve is closed, said backing film being directly exposed to contact with said bonnet and said head to directly receive the forces applied to the outer side of the diaphragm, and operating means coacting with said compressor head to controllably translate the latter toward and away from said weir to close and open the valve.

2. A weir valve comprising, in combination a valve body defining alined flow passages therein, means in said body forming a concave weir surface located between said passages, a valve bonnet secured to said body, a flexible flow control diaphragm covering said weir surface and the adjacent ends of said passages and having its peripheral edge clamped between said body and said bonnet, said diaphragm when in its unstressed condition having a dished shape inwardly of the peripheral edge of the diaphragm, a convex compressor head mounted in said bonnet in confronting relation to the side of said diaphragm opposite from said weir surface, means for translating said head toward and away from said weir surface to effect closing and opening of the valve by the coaction of the diaphragm with said weir surface, said compressor head being dimensioned in relation to said bonnet to leave clearance between the periphery of the diaphragm confronting portion of the head and the bonnet, said diaphragm having a body layer confronting said passages and said weir surface and being formed of a flexible polymeric material having sufficient resiliency to conform to said weir surface upon engagement of said diaphragm body layer with said weir surface to close the valve, said diaphragm having a backing film covering the compressor head side of said body layer and being formed of a flexible polymeric material which is for practical purposes unstretchable in relation to the material forming said body layer, said backing film having a thickness which provides in the film strength that is sufficient to effectively resist stretching of the film by predetermined forces applied thereto through said body layer, said film having an integral, non-cloth structural form which is flexible to flex with said body layer toward and away from said weir surface while at the same time having material resistance to bending and substantial resistance to compressive forces tending to contract the area of the film; and said backing film being exposed to direct engagement by said compressor head and being tightly anchored along its peripheral edge by the direct clamping action thereon of said bonnet to sustain the reaction on the backing film of outward forces transmitted thereto by said diaphragm body layer from fluid pressure within the valve and from said weir surface to thereby confine said diaphragm body layer against outward extrusion into said clearance between said compressor head and said bonnet when said diaphragm is pressed against said weir surface by said head.

3. A weir valve comprising, in combination, a valve body defining flow passages therein, means in said body forming a concave weir surface disposed between said passages, a valve bonnet, a flexible flow control diaphragm covering said weir surface and adjacent portions of said passages and having a peripheral edge clamped between said body and said bonnet, said diaphragm in its unrestrained condition having a dished shape inwardly of the peripheral edge of the diaphragm, a compressor head disposed within said bonnet, means for translating said head toward and away from said weir surface, said head defining a convex diaphragm engaging surface confronting said diaphragm to force the diaphragm into an inwardly convex shape to engage said weir surface and close the valve upon advancement of the head toward said weir surface, a retracting element secured to said diaphragm near the center thereof and connected to said head to force the diaphragm into an inwardly concave shape to open the valve upon retraction of said head away from the weir, the flexing of said diaphragm as an incident to changing the shape of the diaphragm between inwardly convex and concave shapes being most pronounced along an annular hinge line of the diaphragm adjacent the clamped peripheral edge thereof, said diaphragm having a body layer confronting said passages and said weir surface and being formed of a yieldable polymeric material having sufficient resiliency to conform to said weir surface upon engagement of said diaphragm body layer with said weir surface to close the valve, said diaphragm including a backing film covering the compressor head side of said body layer and being formed of nylon which is for practical purposes unstretchable in relation to said yieldable polymeric material forming said body layer, said backing film having a thickness which provides in the film strength that is sufficient to effectively resist stretching of the film by predetermined forces applied thereto through said body layer; said film having an integral, non-cloth structural form which is flexible to flex with said body layer toward and away from said weir while at the same time providing in the film a material resistance to bending and substantial resistance to compressive forces tending to contract the area of the film; a layer of reinforcing material embedded in said diaphragm body layer medially between said backing film and the inner surface of the body layer, said bonnet defining a pair of internal guide slots extending toward said weir in alinement with opposite ends thereof and producing sharp irregularities in said annular hinge line of the diaphragm, said compressor head including projections extending into said respective slots in confronting relation to the diaphragm, said compressor head having a loose fit within said bonnet which produces substantial clearance between the periphery of the compressor head and the portion of the bonnet encompassing the compressor head, and the peripheral edge of said backing film being substantially conterminous with the periphery of said body layer and being tightly anchored by the clmping action thereon of said bonnet.

4. For use in a weir valve comprising a valve body defining flow passages therein and forming a weir between the passages, a valve bonnet disposed in covering relation to the weir, a diaphragm compressor head loosely disposed in the bonnet in opposing relation to the weir, and means for moving the compressor head toward and away from the weir, a flexible flow control diaphragm having a concavo-convex central portion, said diaphragm having a generally flat marginal edge adapted to be clamped between the valve body and valve bonnet to support said central portion of the diaphragm in a position intervening between the compressor head and weir, said diaphragm having a body layer defining the weir side of the diaphragm and being formed of a flexible polymeric material having a relatively low tensile strength and having sufficient resiliency to conform to the weir upon engagement of said diaphragm body layer with the weir to close the valve, said diaphragm having a backing film covering the compressor head side of said body layer and being relatively thin in relation to said body layer, said backing film being formed of a flexible polymeric material which is for practical purposes unstretchable in relation to said polymeric material forming said diaphragm body layer, said film having a thickness which provides in the film tensile strength that is sufficient to effectively resist stretching of the film by predetermined forces applied thereto through the body layer; said film having an integral, non-cloth structural form which is flexible to flex with said body layer toward and away from said weir while at the same time providing in the film a material resistance to bending and substantial resistance to compressive forces tending to contract the area of the film, said film having a peripheral edge substantially conterminous with the periphery of said body layer, a layer of reinforcing fabric embedded in said body layer medially between said backing sheet and the opposite face of the body layer, and a compressor head connecting element embedded in the central portion of the diaphragm.

5. A weir valve comprising, in combination, a valve body defining flow passages therein and including a flow control body portion located between said passages, a flexible flow control diaphragm covering said body portion and the adjacent portions of said passages, said diaphragm having a body layer confronting said passages and being formed of a flexible polymeric material having sufficient resiliency to conform to said flow control body portion upon engagement of said diaphragm body layer with said body portion to close the valve, said diaphragm having a backing film covering the side of said body layer opposite from said passages, said backing film being formed of nylon which is for all practical purposes unstretchable in relation to said polymeric material of said body layer, said film having a thickness which provides in the film tensile strength that is sufficient to effectively resist stretching of the film by predetermined forces applied thereto through said body layer; said film having an integral, non-cloth structural form which is flexible to flex with said body layer toward and away from said body portion while at the same time providing in the film material resistance to bending and substantial resistance to compressive forces tending to contract the area of the film, means engaging the peripheral marginal edge of said film to clamp said diaphragm to said body, a compressor confronting the side of said diaphragm opposite from said passages, and means for translating said compressor toward and away from said body portion to close and open the valve.

6. A weir valve comprising, in combination, a valve body defining flow passages therein and including a flow control body portion located between said passages, a flexible flow control diaphragm covering said body portion and the adjacent portions of said passages, said diaphragm having a body layer confronting said passages and said body portion and being formed of a flexible polymeric material having sufficient resiliency to conform to said body portion upon engagement of said diaphragm body layer with said body portion to close the valve, said diaphragm having a backing film covering the side of said body layer opposite from said passages and being formed of a flexible polymeric material which is for practical purposes unstretchable in relation to said polymeric material forming said diaphragm body layer, said flexible polymeric material forming said film being selected from a group of materals consisting of terephthalate resin and nylon, said backing film having a thickness which provides in the film tensile strength that is sufficient to effectively resist stretching of the film by predetermined forces applied thereto through said body layer; said film having an integral, non-cloth structural form which is flexible to flex with said body layer toward and away from said body portion while at the same time providing in the film material resistance to bending and substantial resistance to compressive forces tending to contract the area of the film, means engaging the peripheral marginal edge of said backing film to clamp said diaphragm to said body, a compressor confronting the side of said diaphragm opposite from said passages, and means for translating said compressor toward and away from said body portion to engage said diaphragm with said body portion to close the valve and to effect movement of said diaphragm away from said body portion to open the valve.

7. A valve comprising, in combination, a valve body defining flow passages therein and a flow control surface disposed between said passages, a flexible flow control diaphragm covering said flow control surface and the adjacent portions of said passages, means clamping the peripheral marginal edge of said diaphragm to said body, a compressor head confronting the side of said diaphragm opposite from said weir, means for translating said head toward and away from said control surface to effect closing and opening of the valve, said diaphragm having a body layer confronting said passages and said flow control surface and being formed of a flexible polymeric material having sufficient resiliency to conform to said flow control surface upon engagement of said body layer with said flow control surface to close the valve, said diaphragm having a backing film covering the compressor head side of said body layer and being formed of a flexible polymeric material which is for practical purposes unstretchable in relation to said polymeric material forming said diaphragm body layer, said film having a thickness which provides in the film strength that is sufficient to effectively resist stretching of the film by predetermined forces applied thereto through said body layer; said film having an integral, non-cloth structural form which is flexible to flex with said body layer toward and away from said flow control surface while at the same time providing in the film material resistance to bending and substantial resistance to compressive forces tending to reduce the area of the film, said compressor head being shaped and dimensioned to provide substantial clearance between the periphery of the compressor head and said means clamping the peripheral marginal edge of the diaphragm, and the peripheral edge of said backing film being tightly anchored by the clamping action thereon of said clamping means.

8. A valve as recited in claim 7 in which said yieldable polymeric material forming said backing film is selected from a group of materials consisting of terephthalate resin and nylon.

9. For use in a weir valve comprising a valve body defining flow passages therein and forming a weir between the passages, a valve bonnet disposed in covering relation to the weir, a diaphragm compressor head loosely disposed in the bonnet in opposing relation to the weir, and means for moving the head toward and away from the weir; a flexible flow control diaphragm having a concavo-convex central portion, said diaphragm having a generally flat marginal edge adapted to be clamped between the valve body and the valve bonnet to support said central portion of the diaphragm in a position intervening between the compressor head and weir, said diaphragm being formed of a body layer defining the weir side of the diaphragm and of a backing sheet covering the compressor head side of said body layer and having a peripheral edge substantially conterminous with the periphery of said body layer, said backing sheet being relatively thin a relation to the thickness of said body layer. said body layer being formed of a yieldable polymeric material having sufficient resiliency to conform to the weir upon engagement of said diaphragm body layer with the weir to close the valve, said backing sheet being formed of a yieldable polymeric material which is for practical purposes unstretchable in relation to said polymeric material forming said diaphragm body layer, and said backing sheet having the physical form of an integral film having a thickness which provides in the film strength that is sufficient to effectively resist stretching of the film by predetermined forces applied thereto through said body layer; said film having an integral, non-cloth structural form which is flexible to flex with said body layer to opposite sides of a plane extending centrally through said marginal edge of the diaphragm in parallel relation thereto and which at the same time has material resistance to bending and having substantial resistance to compressive forces tending to reduce the area of the film.

10. A weir valve diaphragm as recited in claim 9 in which said yieldable polymeric material forming said backing film is selected from materials in a group consisting of terephthalate resin and nylon.

11. For use in a weir valve comprising a valve body defining flow passages therein and forming a weir between the passages, a valve bonnet disposed in covering relation to the weir, a diaphragm compressor head disposed in the bonnet in opposing relation to the weir, and means for moving the head toward and away from the weir; a flexible flow control diaphragm having a concavo-convex central portion, said diaphragm having a marginal edge adapted to be clamped between the valve body and the valve bonnet to support said central portion of the diaphragm in a position intervening between the compressor head and weir, said diaphragm being formed of a body layer defining the weir side of the diaphragm and of a solid and imporous backing sheet covering the compressor head side of said body layer, said body layer being formed of a yieldable polymeric material having sufficient resiliency to conform to the weir upon engagement of said body layer with said weir to close the valve, said backing sheet being formed of a yieldable polymeric material having a minimum elongation of at least three hundred percent and a tensile strength of at least eight thousand pounds per square inch and being for practical purposes unstretchable in relation to said polymeric material forming said body layer, said backing sheet being relatively thin in relation to the thickness of said body layer, said backing sheet having a thickness which provides in the sheet tensile strength that is sufficient to effectively resist stretching of the sheet by predetermined forces applied thereto through said body layer; said sheet having the physical form of an integral, non-cloth film which is flexible to flex with said body layer to opposite sides of a plane extending centrally through said marginal edge in parallel relation thereto and which at the same time has material resistance to bending and substantial resistance to compressive forces in directions generally tangential to the backing sheet.

12. A weir valve comprising, in combination, a valve body defining flow passages therein and including a flow control body portion located between said passages, a flexible flow control diaphragm covering said body portion and the adjacent portions of said passages, said diaphragm being formed of a body layer confronting said passages and of a backing sheet covering the side of said body layer opposite from said passages, said body layer being formed of a yieldable polymeric material having sufficient resiliency to conform to said flow control body portion upon engagement of said diaphragm body layer with said flow control body portion to close the valve, said backing sheet being formed of a yieldable polymeric material which is for practical purposes unstretchable in relation to said polymeric material forming said diaphragm body layer, said backing sheet having a thickness which provides in the sheet tensile strength that is sufficient to effectively resist stretching of the sheet by predetermined forces applied thereto through said body layer; said sheet having the structural form of an integral, noncloth film which is flexible to flex with said body layer toward and away from said body portion of said body while at the same time having material resistance to bending and substantial resistance to compressive forces tending to contract the area of the film; means engaging the peripheral marginal edge of said backing sheet formed by said film to clamp said diaphragm to said body, a compressor confronting the side of said diaphragm opposite from said passages, and means for translating said compressor toward and away from said body portion to engage said diaphragm with said body portion to close the valve and to effect movement of said diaphragm away from said body portion to open the valve.

References Cited in the file of this patent

UNITED STATES PATENTS

| | | |
|---|---|---|
| 2,725,211 | Boteler | Nov. 29, 1955 |
| 2,767,956 | Rubin | Oct. 23, 1956 |

FOREIGN PATENTS

| | | |
|---|---|---|
| 304,128 | Switzerland | Mar. 1, 1955 |